(12) United States Patent
Schmidt et al.

(10) Patent No.: US 6,679,569 B2
(45) Date of Patent: Jan. 20, 2004

(54) METHOD AND DEVICE FOR CONTROLLING A BRAKE SYSTEM

(75) Inventors: Günther Schmidt, Tauberbischofsheim (DE); Jürgen Binder, Stuttgart (DE); Hermann Winner, Karlsruthe (DE); Ulrich Gottwick, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 198 days.

(21) Appl. No.: 09/249,344

(22) Filed: Feb. 11, 1999

(65) Prior Publication Data

US 2001/0045772 A1 Nov. 29, 2001

(30) Foreign Application Priority Data

Feb. 21, 1998 (DE) .................................... 198 07 368

(51) Int. Cl.[7] .............................................. B60T 8/88
(52) U.S. Cl. ................. 303/122.12; 303/11; 303/122.1
(58) Field of Search ..................... 303/122.09, 122.1, 303/122.12, 122.13, 122.14, 115.4, 10, 11, DIG. 1, 1, 4

(56) References Cited

U.S. PATENT DOCUMENTS

| 4,728,156 A | | 3/1988 | Burgdorf et al. |
|---|---|---|---|
| 4,753,492 A | * | 6/1988 | Leiber et al. ................. 303/92 |
| 4,870,390 A | | 9/1989 | Hosoda et al. |
| 5,074,145 A | | 12/1991 | Hattori et al. |
| 5,221,125 A | * | 6/1993 | Okochi et al. ................ 303/10 |
| 5,373,454 A | * | 12/1994 | Kanda et al. .......... 364/551.01 |
| 5,498,070 A | | 3/1996 | Inagawa et al. |
| 5,695,260 A | * | 12/1997 | Tanaka et al. ......... 303/122.12 |
| 5,733,017 A | * | 3/1998 | Nakashima et al. .......... 303/10 |
| 5,941,608 A | * | 8/1999 | Campau et al. ............. 30/113.4 |
| 5,957,549 A | * | 9/1999 | Nagai et al. ............ 303/122.12 |
| 6,007,163 A | * | 12/1999 | Sawada ................. 303/122.09 |

FOREIGN PATENT DOCUMENTS

| DE | 34 18 042 | 11/1985 |
|---|---|---|
| EP | 0 716 003 | 6/1996 |
| WO | WO 94/25322 | 11/1994 |
| WO | WO97/05001 | * 2/1997 |

OTHER PUBLICATIONS

"Electrohydraulic Brake System—The First Approach to Brake–By–Wire Technology," W–D. Jonner et al., SAE Technical Paper Series, No. 960991, International Congress & Exposition, Detroit, Michigan, Feb. 26–29, 1996, pp. 105–112.

* cited by examiner

Primary Examiner—Douglas C. Butler
Assistant Examiner—Bradley King
(74) Attorney, Agent, or Firm—Kenyon & Kenyon

(57) ABSTRACT

In a method and a device for controlling a brake system, the wheel brake pressure is set at the wheel brakes electrically as a function of the driver's braking input. The high-pressure supply arrangement for pressure buildup, for which at least one pump and one accumulator are provided, is monitored by comparing the change in accumulator pressure to a least one permissible limiting value. In the case of a fault in the pressure supply, it is made possible for the driver to grip through hydraulically to the wheel brakes.

6 Claims, 4 Drawing Sheets

METHOD AND DEVICE FOR CONTROLLING A BRAKE SYSTEM

FIELD OF THE INVENTION

The present invention relates to a method and a device for controlling a brake system.

BACKGROUND INFORMATION

A method and a device for controlling a brake system are known. For example, SAE Paper 960991 describes an electrohydraulic brake system in which a braking command input of the driver is derived from the actuation of the brake pedal by the driver. This input is converted into setpoint braking pressures for the individual wheel brakes, optionally taking into account other braking variables. The setpoint braking pressures are adjusted for each wheel by pressure closed-loop control circuits as a function of the prescribed setpoint pressure and the actual braking pressure as measured in the area of the wheel brake. In a hydraulic brake system of this type, an accumulator is provided which is charged by an electrically controllable pump for supplying pressure to the brake system. Since the functioning of this pressure supply is essential for the operational readiness of the electrohydraulic brake system, the correct function of the pressure supply must be monitored. In addition, provision must be made for measures which permit the driver to apply the brakes of the motor vehicle equipped with the brake system, even in the case of a failure of the pressure supply.

SUMMARY OF THE INVENTION

An object of the present invention is to provide measures by which the operativeness of the pressure supply of an electrohydraulic brake system can be reliably determined. In addition, measures are to be provided which assure reliable operation of the brake system even in the case of failure of the pressure supply of the electrohydraulic brake system.

A reliable operating procedure for monitoring the operativeness of the pressure supply of an electrohydraulic brake system is made available. In this context, the recognition of failure occurs very quickly and accurately as a result of the evaluation of gradients. It is not necessary to wait for a complete charging cycle of the pressure supply accumulator. It is particularly advantageous that various sources of failure can be isolated.

It is advantageous that, for the pressure change, setpoint values are formed in which the prevailing operating state of the pump is taken into account. This contributes to the accuracy, the speed, and the reliability of fault detection.

It is a further advantage that the monitoring of the operativeness of the pressure supply is limited to operating states in which the accumulator pressure is to be built up or maintained, so that it is not necessary (i.e., need not be observed) to monitor the correct accumulator level during a braking intervention (which is very unreliable and difficult), during which volume is removed from the accumulator.

In this context, monitoring the accumulator pressure takes place by means of sensing a preselected absolute minimal pressure PSY.

In addition, it is advantageous that in the event of a fault, as a result of switching to a purely hydraulic brake system, the braking of the motor vehicle equipped with the electrohydraulic brake system is assured.

DETAILED DESCRIPTION

Figure 1:
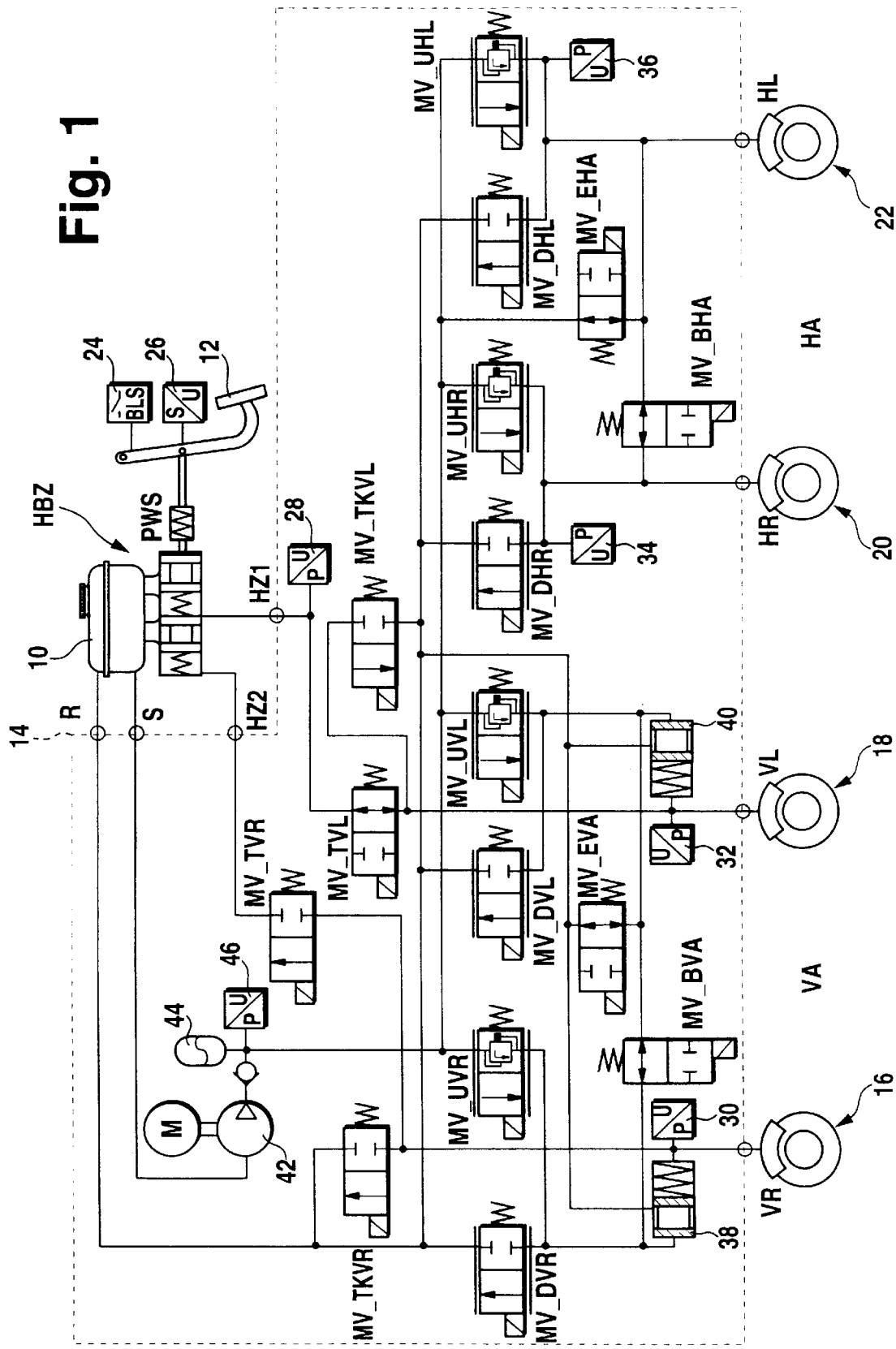
FIG. 1 shows a preferred exemplary embodiment of an electrohydraulic brake system according to the present invention.

FIG. 1 depicts a preferred exemplary embodiment of an electrohydraulic brake system. It shows a main brake cylinder HBZ having a reservoir 10, to which a brake petal is attached which can be actuated by the driver. In addition, a hydraulic aggregate 14 is provided which contains the valve and pump arrangements for controlling the wheel brakes 16, 18, 20, and 22. Connected to brake pedal 12 is a brake pedal switch 24 which closes upon actuation of the brake pedal, and a measuring device 26 for determining the deflection of the brake pedal. The brake pedal switch can be executed as a simple make contact switch, or, to improve the monitoring capacity, as a double switch having an opener and a make-contact switch. Similarly, measuring device 26 for determining the deflection of the pedal can be executed in a redundant fashion. In addition, provision is made for a pedal travel simulator PWS which, upon actuation of the brake pedal, simulates a counteracting force for the driver. Connected to the main brake cylinder HBZ are the two brake circuits, respectively, HZ1 and HZ2. In each of these, a separating valve, MV_TVR and MV_TVL, respectively, is inserted, the valve being closed by a flow of electricity in an electrically controlled brake system. Upstream of the separating valve, in at least one of the brake circuits, a pressure sensor 28 measures the pressure exerted by the driver through the brake pedal actuation. In response to the separating valves being closed, the main brake cylinder is hydraulically separated from the pressure regulating system. The pressure regulation system contains a pressure modulator for the brake pressure regulation for every wheel brake. In this context, each pressure modulator includes an inlet valve (MV_UVR, MV_UVL, MV_UHR, MV_UHL), an outlet valve (MV_DVR, MV_DVL, MV_DHR, MV_DHL) and a pressure sensor 30, 32, 34, and 36, which measures the pressure in the line leading to the wheel brake. In the two front wheel pressure modulators, there is a media separating piston 38 and 40, respectively, between the valves (inlet and outlet valve) and the pressure sensors or the wheel brakes. The pressure modulators are connected via equalizing valves MV_BVA, and MV_BHA, which can be controlled independently from each other by an electrical charge. In addition, provision is made for safety valves MV_EVA and MV_EHA for each axle, which, in an uncharged state, make possible the release of pressure from the wheel pressure modulators of an axle. They connect the pressure modulators of one axle with the feedback lines leading to reservoir 10. In an electrically controlled operating state, these two valves are permanently electrically charged, i.e., closed.

In addition, provision is made in each case for a temperature compensation valve MV_TKVL and MV_TKVR for each front wheel pressure modulator. In an uncharged state, these valves are closed and are opened to release pressure from the pressure modulator of a front wheel using an electric charge, if certain states are present, in particular a very long braking duration. The temperature compensation valves connect the brake line leading to the wheel brake to the feedback line. The energy for the brake pressure modulation comes from a single-piston high-pressure pump 42, which is driven by an electric motor. The pump is connected to a high-pressure accumulator 44, which functions as an intermediate buffer and whose pressure is measured by a pressure sensor 46.

The pressure line of pump 42 leads to the inlet valves of the wheel brake, whereas the suction line of pump 42 is connected to reservoir 10. For the details of the hydraulic circuit, reference is made to the preferred exemplary embodiments depicted in FIG. 1. However, the operating procedure according to the present invention described below is advantageously used not only in connection with a hydraulic circuit of this type, but in every case where, in connection with electrically controlled brake systems having an electrically controllable pressure supply arrangement, the pressure is subject to the monitoring of the pressure supply.

In normal operation, the brake system depicted in FIG. 1 operates as follows. The driver steps on the brake pedal. In this context, he senses a contrary force that is dependent on the path. This path-dependency is configured by the defined characteristics of the pedal path simulator. In response to sensing a braking input via the pedal path sensor, the brake pedal circuit and/or the pressure sensor, the separation valves (MV_TVR and MV_TVL), and the safety valves (MV_EHA and MV_EHA) are closed.

In the main brake cylinder HBZ, pressure builds up as the result of the pedal force. From the signals of the brake light switch 24, the path sensor 26, and/or the pressure sensor 28, the driver's braking input is calculated, for example, as setpoint delay or as setpoint braking force. The individual setpoint wheel brake pressures are formed from this braking input. In accordance with the driving conditions and the potential for skidding, these pressures are modified and are regulated via the wheel pressure modulators through electrically charging the valve.

In the closed circuit, for each wheel brake, the prevailing pressures are retrieved at the wheel pressure sensors for the variance (i.e., setpoint-actual) comparison. In response to varying the setpoint pressures in the left and in the right wheel of one axle, the equalizing valves are closed and the preselected setpoint pressure in each wheel brake is regulated by controlling the inlet and outlet valves along the lines of regulating the actual brake pressure with a view towards the setpoint brake pressure.

In order to build up pressure at one wheel brake, the inlet valve is electrically charged to the point that the desired setpoint pressure forms in the wheel brake having the desired dynamic response. Correspondingly, a pressure reduction is achieved by electrically charging the outlet valves, with the brake fluid flowing back into the reservoir via the return line. In the case of a system failure, the relief valves come into play. If the electrical system fails during a braking action, all valves return to their uncharged state. The relief valves then open the pressure modulators to the return line, so that no brake pressure can be shut in. In the same way, in its rest state, these valves, in response to fluctuations in temperature, permit an equalization of volume with the reservoir.

Pump 42 is actuated in response to an active braking procedure and/or in response to a sinking of the accumulator pressure in the accumulator 44 below a preselected value. Apart from this function, detected accumulator pressure 46 is also evaluated in the context of the regulation, since the accumulator pressure essentially represents the pressure present at the entrance to the inlet valve.

Figure 2:
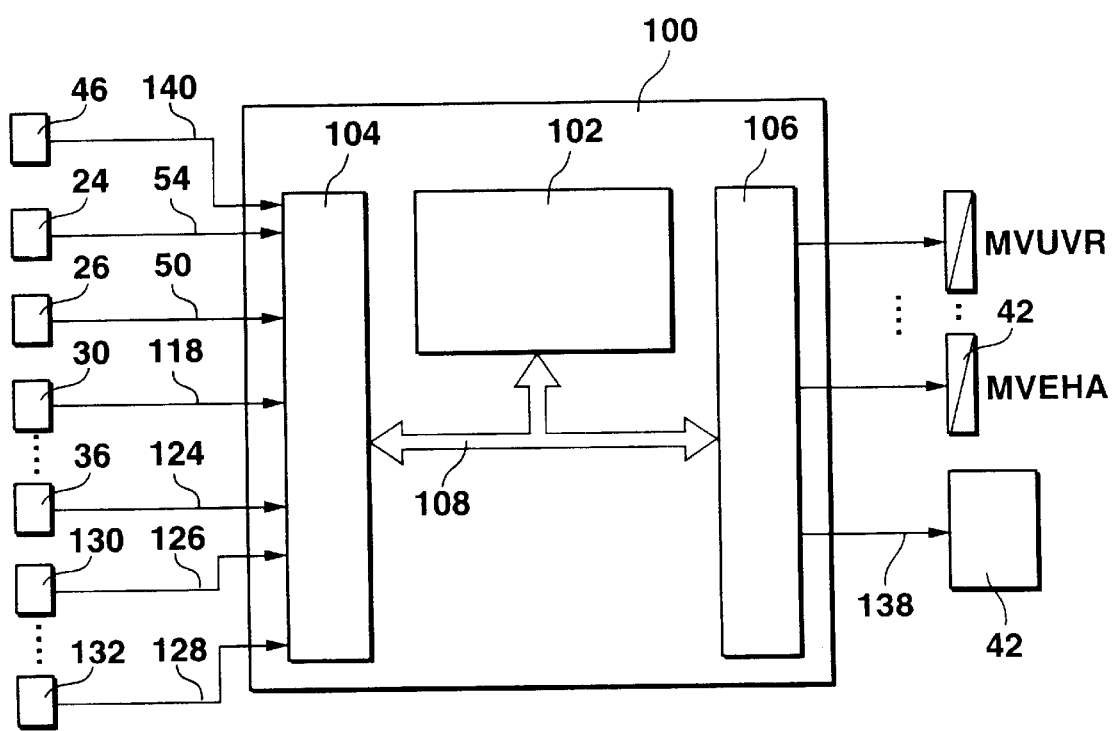
FIG. 2 shows a control unit controlling the electrohydraulic brake system according to the present invention.

The electrically actuated valves, in addition to pump 42, are controlled by at least one electronic control unit, which is sketched in FIG. 2. In this context, the control unit includes at least one microcomputer 102, one input circuit 104, one output circuit 106, and one bus system 108 connecting these elements, for reciprocal data exchange. Lines 50 and 54 are routed from brake pedal switch 24 and pedal path sensor 26 to input circuit 104. In addition, input lines 118 through 124 connect input circuit 104 to sensors 30 through 36, assigned to each wheel brake. In addition, provision is made for an input line 140 which runs from measuring device 46 for detecting the accumulator pressure of input line 104. Further input lines 126 through 128 connect input circuit 104 with measuring devices 130 through 132 for detecting further operating variables of the brake system, of the vehicle and/or of its drive unit. Operating variables of this type are, for example, wheel velocities, optionally the motor torque produced by the drive unit, axle loads, the pressure in the brake line (sensor 28), etc. A plurality of output lines are connected to output circuit 106. For example, depicted are the output lines by which the valves of the pressure modulators are actuated. Pump 42 is controlled via a further output line 138. Control unit 100 controls the brake system as a function of the signal variables supplied, in the above sense.

Figure 3:
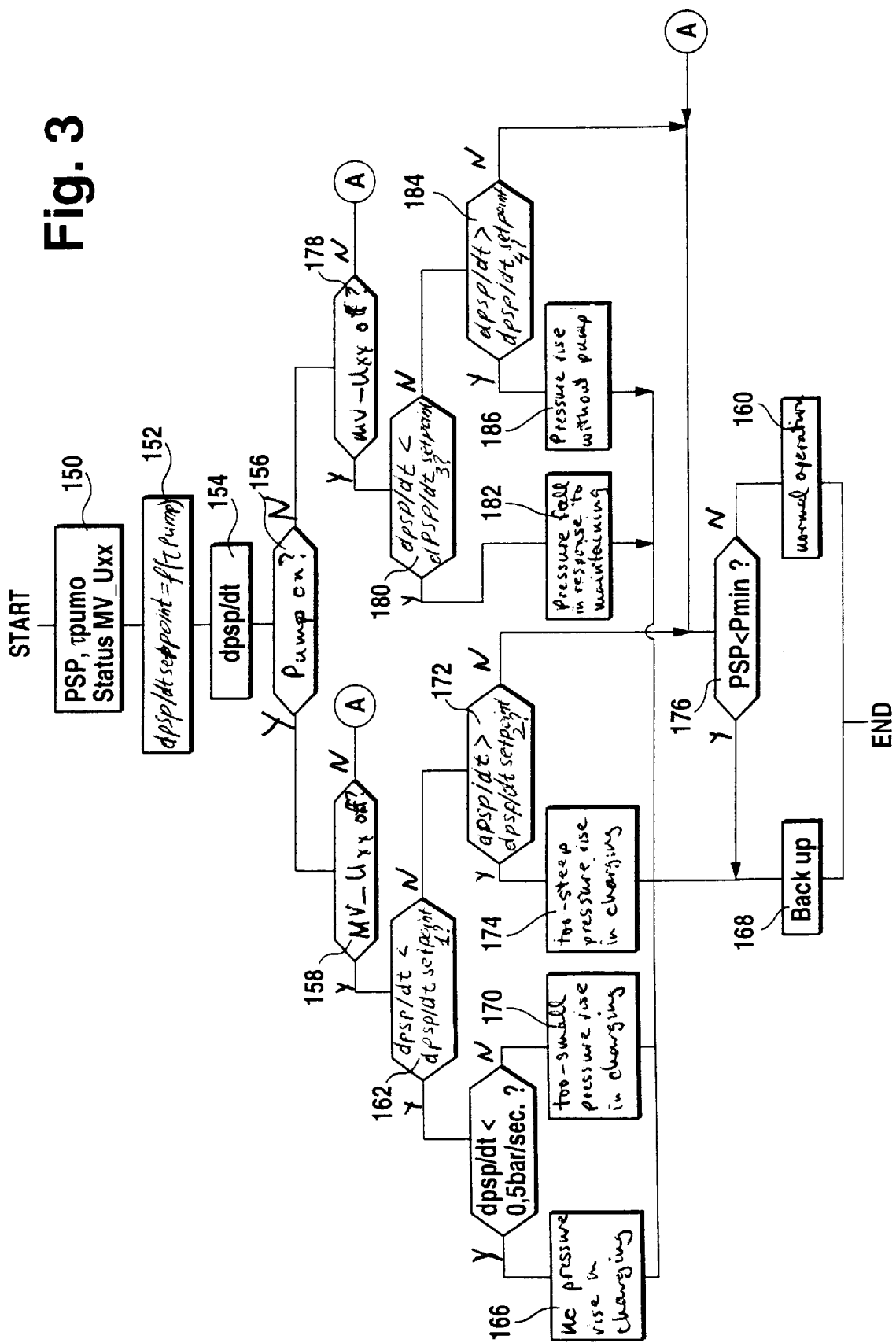
FIG. 3 shows a flow chart illustrating a preferred exemplary embodiment of the pressure-supply monitoring and emergency measures as a microcomputer program.

FIG. 3 depicts a preferred embodiment on the basis of a flow chart, which describes, as the program of microcomputer 102, the realization of the monitoring of the pressure supply and the initiation of an emergency braking operation in the case of a fault. The program is run during the operation of the motor vehicle at preselected time intervals.

In first step 150, the measured accumulator pressure PSP, the pulse duty factor (i.e., a pulse control factor) $_T$PUMO of the pump motor, as well as the status of the buildup valves MV_Uxx are read in. In the preferred exemplary embodiment, the pump motor for charging the accumulator is driven by a pulse-width modulated, changeable clock pulse. Driving signal $_T$PUMO represents the prevailing pulse duty factor, at which the pump motor is actuated. The status of the buildup valves is determined on the basis of the valve flows, the valve being opened or closed, when a valve flow is present, as a function of the strength of the valve flow and of the pressure gradient applied at the valve, and, when a valve flow is not present, the valve being in its output position, i.e., closed. In next step 152, a setpoint value is determined for changing the accumulator pressure over the time dPSP/dt, in particular for the accumulator pressure gradient, as a function of the pulse duty factor of the pump motor driving signal, and, if appropriate, of the prevailing accumulator pressure. In the preferred exemplary embodiment, an upper and a lower limit for the pressure change is derived from characteristic curves, tables, and/or calculation steps as a function of the pump driver signal variable. In another exemplary embodiment, an average setpoint value is formed for whose evaluation tolerance values are considered, so that an upper and a lower threshold result. Since the pump performance is dependent on temperature, the setpoint value for accumulator pressure can be restricted even more precisely if, in addition, a temperature signal is read in.

In next step 154, the accumulator pressure change over time period dPSP/dt is formed on the basis of the prevailing measured accumulator pressure and a pressure value calculated in a previous program run. The measured signal is filtered as needed in order to be able to disregard pressure pulsations during recharging. In subsequent query step 156, it is determined whether the pump is switched on. Preferably, this is done on the basis of a driving signal, the pump being considered as switched on if a driving signal is output. If the pump is switched on, in step 158 it is examined whether all buildup valves and MV_Uxx are closed. If this is not the case, the system finds itself in a condition of volume removal from the accumulator, during which the accumulator pressure in the accumulator is monitored at a minimal pressure (the Psp>Pmin, e.g., 130 bar). Therefore, normal operation is assumed in accordance with step 160 and the electronic control of the brake is performed. If the accumulator pressure falls below the minimal pressure, the electrical regulation system is passively connected.

If all the buildup valves are closed, in step 162 the prevailing accumulator pressure change dPSP/dt is compared with the setpoint change. If the prevailing value is smaller than the (lower) setpoint value, in succeeding step 164 it is examined whether the change in the accumulator pressure is smaller than a preselected limiting value, for example, 0.5 bar/sec. In this case, in accordance with step 166, a fault situation is established, in accordance with which no buildup in pressure occurs during charging. For example, this can be due to the fact that the pump, despite the triggering, is not running, that leakage has occurred in the area of the pressure supply, that air is present in the intake line of the pump, and/or that the accumulator pressure sensor is defective. This fault condition is indicated and is filed in a memory unit, and, in accordance with step 168, the switch is made to a purely hydraulic operation of the brake system, due to faulty pressure supply. For this purpose, the separating valves MV_TVR and MV_TVL are opened. In addition, all other solenoid valves pass over into the uncharged state. Then, brake pressure can be built up by the driver using the main cylinder, the opened separating valves, and the brake line to the front wheels. In this emergency brake operation, the rear wheels remain unbraked.

If step 164 reveals that in the course of a change within the preselected setpoint change, the speed of the accumulator pressure buildup exceeds the threshold value monitored in step 164, then, in accordance with step 170, the assumption is made of a too-small pressure buildup during charging. A too-small pressure buildup of this type can arise in a reduced pump performance as a result of undervoltage or inner leakage, as a result of air or blockage in the intake line, as a result of leakage to the outside or via the buildup valves, which are generally closed, as a result of a pressure sensor fault, or as a result of a too-soft accumulator. The corresponding fault condition is indicated and is filed in the fault memory. Then, in accordance with step 168, the emergency braking operation is initiated.

If it was not determined in step 162 that the accumulator pressure change was smaller than the preselected setpoint value, in the succeeding step 172, it is examined whether the gradient is larger than the (upper) setpoint value. If the accumulator pressure gradient is larger than the preselected setpoint value, then in accordance with step 174, a too-steep pressure buildup is indicated during charging. For example, this results from an accumulator that is too hard, if it is blocked or if gas has escaped, or in response to an accumulator pressure sensor fault. The corresponding fault condition is indicated and filed in memory, and the brake system in accordance with step 168, is switched to emergency braking operation.

If, during charging, a too-steep pressure buildup is recognized as a fault condition, no distinction can be made in the unbraked condition between an accumulator pressure sensor fault and a too-hard accumulator. This can only be achieved during the next braking operations, the actual wheel brake pressure being smaller than the setpoint brake pressure at all the wheels, in response to an accumulator pressure sensor fault in the next braking operations. This is so because insufficient pressure is available from the pressure supply. In an exemplary embodiment, the accumulator pressure sensor fault is distinguished from a too-hard accumulator by monitoring the wheel pressure profile during the next braking operations. This is advantageously exploited for a splitting of the emergency brake operation, at first only the driver being warned of a recognized too-steep pressure buildup in response to a recognized fault condition, without having recourse to the emergency level. In this case, the pump is triggered only in response to an existing braking input. If, after several braking operations, it is seen that an accumulator pressure sensor fault is present, the emergency braking operation is initiated as it is described on the basis of step 168. Instead of switching to the emergency braking operation, it is possible to switch into an emergency brake operation in which the accumulator pressure is estimated through a suitable hydraulic model from the characteristic curves of the wheel pressure and the pump control. The necessary charging of the inlet valves for a pressure buildup is also a function of the accumulator pressure. Therefore, the accumulator pressure can be estimated with limited precision.

Accordingly, in response to a too-small pressure buildup during charging of the accumulator (step 170), provision is made that not the entire brake passes into the emergency brake operation, but that only those functions are switched off which require a very great dynamic force from the pressure buildup and therefore require a proper pressure supply. Functions of this type are, for example, anti-blocking protection, drive slip control, or driving dynamic control. In an exemplary embodiment, the above are switched off in response to a too-small pressure buildup, while the operating braking function continues to be electrically controlled.

If step 172 shows that the gradient is smaller than the setpoint value, in the succeeding step 176 the absolute value of the accumulator pressure PSP is compared with a preselected minimal system pressure PMIN., e.g., 130 bar. If the accumulator pressure is less than this system pressure, the assumption is made of a fault in the pumping function and, in accordance with step 168, the emergency braking operation is initiated. Alternatively, if the accumulator pressure is greater than the minimal system pressure, the pressure supply is operating correctly, so that normal operations, in accordance with step 160, are carried out.

In maintaining the accumulator pressure, if the pump is not triggered, corresponding monitoring measures come into play. If the pump is not actuated (see step 156), in step 178 it is examined whether the buildup valves MV_Uxx are closed. If this is not the case, this system is in an operating state having volume removal, so that no monitoring of the pressure supply takes place. If the valves are closed, in step 180 the accumulator pressure gradient is compared with the setpoint gradient. If the accumulator pressure gradient is less than the (lower) setpoint pressure gradient, which for maintaining the accumulator pressure is in the area of zero, then, in accordance with step 182, in the process of maintaining the pressure, a pressure reduction is assumed as a fault condition. This can be the result of internal leakage in the area of the back-pressure valve or buildup valves, of other external leakage, or of a sensor fault. The consequence is an emergency braking operation, in accordance with step 168.

If the gradient, in accordance with step 180, is not smaller than the setpoint gradient, then, in step 184 it is examined whether the gradient is greater than the (upper) setpoint gradient. In this case, in accordance with step 168, the assumption is made concerning a pressure buildup without triggering the pump, which can occur as a result of a pressure sensor failure or from a pump being incorrectly triggered electrically. In this case, the emergency brake operation is also initiated, also in accordance with step 168. If the system is working normally, i.e., the pressure gradient, in accordance with step 184, does not exceed the setpoint value, then, in accordance with step 176, the accumulator pressure is compared with the minimal system pressure value. If the system pressure is lower, the emergency brake operation is carried out; otherwise the operation is normal.

The described monitoring of the function of the high-pressure supply of the brake system functions during the entire operating cycle of the motor vehicle. In this way, a constant monitoring of the high-pressure supply is assured, and the operational reliability of the electrohydraulic brake system is significantly improved. If a fault is recognized which leads to a purely hydraulic emergency braking operations, then there is no monitoring until the next operating cycle.

Figure 4:
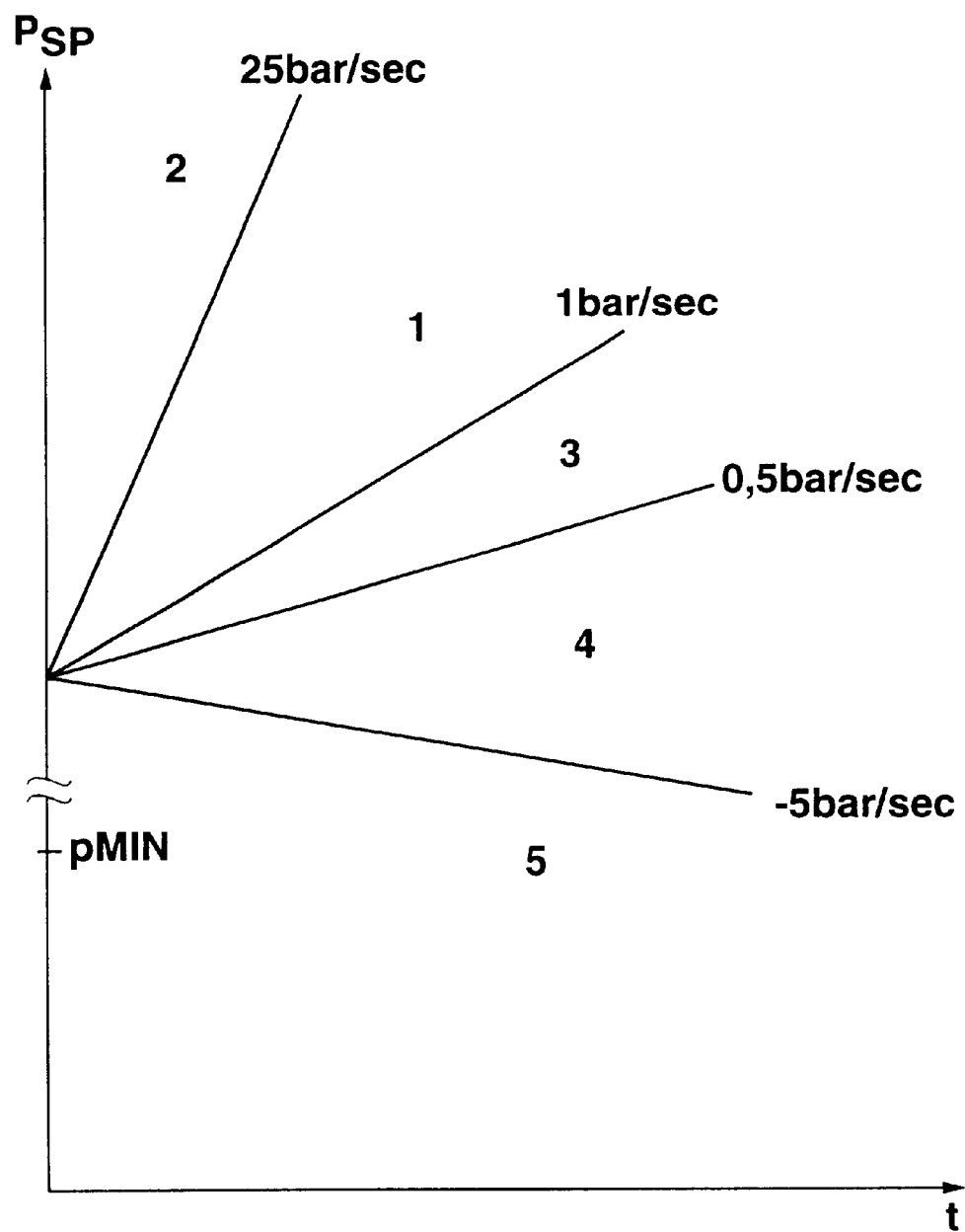
FIG. 4 shows a diagram clarifying the flow chart shown in FIG. 3.

The monitoring operations on the basis of pressure change (e.g., pressure gradients, change in velocity) are clarified on the basis of timing diagram in FIG. 4. There, the accumulator pressure value PSP is depicted across time.

The line segments shown there represent limiting values for the pressure gradients in a preferred exemplary embodiment. In this context, a pressure gradient between 1 bar/sec and 25 bar/sec is assumed as the setpoint value. If the pressure gradient runs within this area (1), then the assumption is made that the pressure supply is in working order. If the pressure gradient is above the upper limiting value (area 2), then a too-steep pressure buildup is taking place. Below the limiting value, above a further limiting value of 0.5 bar/sec (area 3), the assumption is made of a too-small pressure buildup, whereas below this limiting value, down to the horizontal line (area 4), the assumption is that there is no pressure buildup. In the case of maintaining pressure (no pump triggering), a setpoint value of −5 bar/sec should be indicated. In this way, an erroneous initiation of the monitoring in response to a temperature adjustment in the accumulator after a charging procedure can be prevented. This means that in response to the values below this setpoint value (area 5), in the case of pressure maintenance, the assumption can be made of an implausible pressure decrease. Above the horizontal line (0 bar/sec), assuming maintenance of pressure, the assumption is made of a pressure buildup without triggering the pump. This is not drawn in FIG. 4.

What is claimed is:

1. A method for controlling a brake system of a motor vehicle, comprising:
   actuating a valve arrangement using an electrical system to adjust a brake pressure of wheel brakes of the brake system, the brake pressure being adjusted as a function of a braking input provided by a driver of the motor vehicle;
   switching on a controllable pump of a pressure supply arrangement to charge at least one accumulator of the pressure supply arrangement in preselected operating states;
   determining a predetermined setpoint value as a function of a pulse duty factor of a driving signal of the pump and the pressure supply arrangement; and
   monitoring an operating of the pressure supply arrangement by:
      comparing a change value to the predetermined setpoint value, the change value representing a change in pressure of the accumulator, and
      detecting at least one fault condition based on the comparison of the change value to the predetermined setpoint value;
   wherein the monitoring step is performed only when the brake system is not in a condition of volume removal from the at least one accumulator during a braking operation.

2. A method for controlling a brake system of a motor vehicle, comprising the steps of:
   actuating a valve arrangement using an electrical system to adjust a brake pressure if wheel brakes of the brake system, the brake pressure being adjusted as a function of a predetermined braking input which is provided by a driver of the motor vehicle;
   switching on a controllable pump of a pressure supply arrangement to charge at least one accumulator of the pressure supply arrangement in preselected operating states, the switching on step including:
      detecting a first fault condition indicative of a no pressure buildup condition when the change value is less than the predetermined setpoint value and less than a further limiting value, and
      detecting a second fault condition indicative of a too small of a pressure buildup condition when the change value exceeds the further limiting value;
   monitoring an operating of the pressure supply arrangement as a function of a chance value of an accumulator pressure of the at least one accumulator over a predetermined time period; and
   comparing the change value to at least one predetermined setpoint value.

3. The method according to claim 2, wherein the switching on step includes the substep of:
   detecting a third fault condition indicative of a too steep of a pressure buildup condition when the change value exceeds the predetermined setpoint value.

4. The method according to claim 3, wherein the switching on step further includes the substep of:
   detecting a fourth fault condition indicative of an accumulator pressure sensor condition when, in response to successive braking actions at wheels of the motor vehicle, an actual wheel brake pressure is less than a predetermined setpoint wheel brake pressure, the predetermined setpoint wheel brake pressure being determined by the driver.

5. A method for controlling a brake system of a motor vehicle, comprising:
   actuating a valve arrangement using an electrical system to adjust a brake pressure of wheel brakes of the brake system, the brake pressure being adjusted as a function of a braking input provided by a driver of the motor vehicle;
   switching on a controllable pump of a pressure supply arrangement to charge at least one accumulator of the pressure supply arrangement in preselected operating states;
   when a first fault condition indicative of a too small of a pressure buildup condition is detected, deactivating first functions which require a substantial dynamic performance from a pressure buildup;
   when a second fault condition indicative of a too steep of the pressure buildup condition is detected, providing a warning to the driver;
   when a third fault condition indicative of an accumulator pressure-sensor condition is detected, switching off the electrical system and changing from the electrical system to a hydraulic control system;

when the pump is switched off, detecting a fourth fault condition indicative of a pressure decrease during a holding condition when a pressure gradient is below a predetermined setpoint value; and when the pump is switched off, detecting a fifth fault condition indicative of a pressure buildup when a change value of an accumulator pressure of the at least one accumulator exceeds the predetermined setpoint value.

6. A device for controlling a brake system of a motor vehicle, comprising:

a valve arrangement for adjusting a brake pressure of wheel brakes of the brake system;

a pressure supply arrangement including at least one accumulator and a controllable pump; and an electronic control unit electrically regulating the brake pressure as a function of a braking input by actuating the valve arrangement, the control unit switching on the pump to charge the at least one accumulator in preselected operating states the control unit including a fault recognition arrangement which monitors an operation of the pressure supply arrangement as a function of a change value of an accumulator pressure in the at least one accumulator over a predetermined time period, which determines the predetermined setpoint value as a function of a pulse duty factor of a driving signal of the pump of the pressure supply arrangement, which compares the change value to the predetermined setpoint value, and which detects at least one fault condition based on the comparison of the change value to the predetermined setpoint value.

* * * * *